United States Patent

Taylor

[15] 3,655,342

[45] Apr. 11, 1972

[54] DRYING CHLORINE

[72] Inventor: Otis C. Taylor, Jackson, Tex.

[73] Assignee: The Dow Chemical Company, Midland, Mich.

[22] Filed: Feb. 20, 1970

[21] Appl. No.: 13,184

[52] U.S. Cl. ....................23/219, 23/154
[51] Int. Cl. ....................C01b 7/02, C01b 7/08
[58] Field of Search ....................23/219, 154

[56] References Cited

UNITED STATES PATENTS 3,522,007 7/1970 Frevel et al. ....................23/219
3,534,562 10/1970 Thijssen ....................23/219 X

*Primary Examiner*—Oscar R. Vertiz
*Assistant Examiner*—G. Alvaro
*Attorney*—Griawold and Burdick, William R. Norris and Lloyd S. Jowanovitz

[57] ABSTRACT

Water is removed from chlorine gas or liquid by incorporating phosgene into the chlorine and contacting the mixture with a drying catalyst which promotes hydrolysis of the phosgene. Water contents are thus reduced to a few parts per million, e.g. less than 10 parts per million, on a volume basis. In a preferred embodiment, chlorine gas containing some carbon monoxide is passed through a phosgene generating catalyst such as activated carbon. The reaction conditions in the carbon bed are controlled to produce a sufficient amount of phosgene to react with much, if not all, of the water present in the chlorine gas on later contact with the drying catalyst.

6 Claims, No Drawings

DRYING CHLORINE

The present invention concerns an improved method for drying chlorine and is more especially concerned with a process involving incorporating phosgene into the chlorine to be dehydrated.

In the art of drying chlorine gas, a well established practice involves contacting the chlorine gas stream with concentrated sulfuric acid. Although the treatment is effective for removing the bulk of entrained moisture, a considerable amount of water may remain in the chlorine. This residual moisture content is often the cause of severe corrosion and may upset further processing in the event the chlorine is liquified.

Previous proposals to remove such low water residuals from the chlorine gas include additional scrubbing with a concentrated sulfuric acid or absorbing the water on a suitable desiccant. Guerin, U.S. Pat. No. 2,786,816 exemplifies the latter approach by drying chlorine on activated alumina. Other desiccants such as silica gel and molecular sieves may be used in place of alumina.

Although satisfactory to a degree, the foregoing additional drying operations, sometimes referred to as "trim drying" operations, introduce several problems. For instance, scrubbing with concentrated sulfuric acid introduces an acid mist in the dried chlorine which is very difficult to remove. Further, because it is a scrubbing operation, efficient contacting requires relatively complex liquid handling and recovery operations.

Absorption of the water over a desiccant, of course, necessitates periodic regeneration of the desiccant. Also, since the absorption process is reversible, the amount of water that can be absorbed before regeneration is necessary is a relatively small amount if water residuals are to be controlled to very low levels, e.g. less than about 10 parts per million on a volume basis.

In view of the foregoing, it would be highly desirable to provide an improved process for drying chlorine and it is a particular object of the instant invention to provide such a process.

A further object is to provide a method for rapidly and efficiently drying chlorine to very low water residuals.

A still further object is to provide a drying process in which there is no need for reagents which need to be regenerated.

The foregoing objects, and other benefits as will become apparent hereinafter, are achieved in the instant invention, which comprises the following operations: Phosgene is incorporated into a chlorine gas or liquid stream containing water to be removed. The resulting mixture is contacted with a catalyst for the hydrolysis of phosgene whereby the water content of the chlorine gas stream is reduced.

Incorporation of the phosgene in the chlorine is readily accomplished. One mode is simple direct administration thereof into the chlorine. Since chlorine gas, especially that produced in diaphragm cells, contains some carbon monoxide, and the hydrolysis catalyst also catalyzes the reaction of CO and $Cl_2$ to produce phosgene, it is possible to produce the phosgene in situ. If there is insufficient carbon monoxide present in the chlorine to produce enough phosgene to remove the water, it may be added thereto from an external source.

The amount of phosgene incorporated may exceed, or be substantially less than, the stoichiometric equivalent of the water contained in the chlorine gas stream to achieve some of the benefits of the instant invention. Generally, however, the amount of phosgene incorporated into the chlorine will be controlled to within from approximately 1 to 2 moles thereof for each mole of water to be removed.

It is well established that phosgene hydrolyzes according to the following reaction:

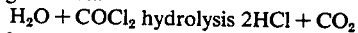

$$H_2O + COCl_2 \text{ hydrolysis } 2HCl + CO_2$$

Catalysts known to promote the foregoing reaction include activated carbon, (Wollthan, U.S. Pat. No. 2,832,670 and Brinkmaun et al., U.S. Pat. No. 2,773,898) and activated alumina (Frevel et al., U.S. Pat. No. 3,376,113).

In a practical application of the instant invention, the chlorine is first dried by scrubbing with concentrated sulfuric acid. This usually reduces the water content to within the range of from about 30 to about 100 parts per million, on a volume basis. The amount of phosgene utilized to finally dry the partially dried chlorine will vary within the range from about 30 up to about 200 parts per million basis.

Catalysts utilized to promote the drying hydrolysis reaction can be any solid catalyst which enhances the rate of phosgene hydrolysis and which is characterized by a catalytic surface essentially unaffected by chlorine for at least 2 months. Preferred drying catalyst compositions have been discovered to be silica gel and sodium alumino silicates. These catalysts produce high drying rates. Other catalysts include the phosgene hydrolysis catalysts described above. In general, the most effective catalysts are characterized by a high surface area, e.g. greater than 2 square meters per gram (B.E.T.) and a high affinity for water.

Contacting the chlorine with the drying catalyst is carried out in any convenient manner. For instance, a mixture of chlorine gas, water vapor and phosgene can be passed through a porous bed containing the catalyst solids. With a preferred catalyst, the reaction is very rapid and, as a consequence, high space velocities are permissible. Space velocities through such catalyst beds in the range of from about 300 up to about 1,000 standard cubic feet per hour of chlorine gas per cubic foot of catalyst bed have resulted in satisfactory results at ambient temperatures. Higher space velocities would permit drying the chlorine satisfactorily, but would produce an undesirable pressure drop in the process. Increasing the catalyst bed temperature increases the permissible rates for efficient reaction. In general, the dehydration hydrolysis reaction can be carried out over the temperature range from about 0° C. up to about 100° C. Preferably, it is carried out within a range from about 20° C. to about 50° C.

In a special and preferred embodiment of the instant invention, phosgene is incorporated into a chlorine gas stream by preparing it in situ. This is accomplished by contacting the chlorine gas stream with carbon monoxide in an amount sufficient to produce a small amount of phosgene in the presence of a catalyst for the reaction such as activated carbon. The carbon monoxide reacts with chlorine to produce a desired concentration of phosgene for later hydrolysis. By controlling the amounts of carbon monoxide and the temperature of the phosgene generating catalyst bed, the quantity of phosgene so incorporated into the gas stream can be regulated. Increasing contact times also increases the amount of phosgene produced. Suitable reaction temperatures are within the range of 0° to 100° C., preferably from about 20° to 50° C. A desired level of phosgene production is readily achieved by control of these parameters.

Phosgene generating catalysts also include the aforementioned drying catalysts for the hydrolysis reaction. Accordingly, it is possible in the practice of the instant invention to generate phosgene and hydrolyze it, thereby drying the chlorine, in the same catalyst bed. It is preferred practice, however, to sequentially prepare phosgene and then hydrolyze it in separate catalyst beds. Best results are achieved with phosgene generating catalysts having a relatively low affinity for water, such as activated carbon.

As previously mentioned, the phosgene can be also incorporated into the chlorine gas stream by simple direct administration of phosgene from an independent source. In still another method, the carbon monoxide can be generated externally and administered to the chlorine gas stream ahead of a phosgene-generating catalyst.

Once hydrolysis of the phosgene has been achieved, its products may be separated from the chlorine by well-known purification methods. The hydrolysis process introduces no new impurities, but only small amounts of the same impurities which are already present in the chlorine stream, i.e. carbon dioxide and hydrogen chloride. Alternatively, the hydrogen chloride and carbon dioxide may be allowed to remain in the dry chlorine without detriment to many of the uses for chlorine.

The instant invention will be exemplified by reference to the following examples. Unless otherwise specified all concentration values are on a volume basis.

EXAMPLE 1

A gas train for the processing of chlorine vapor in accordance with the present invention incorporating a phosgene-generating reactor and a drying bed was assembled. The gas train received chlorine vapor from a diaphragm cell for the electrolysis of sodium chloride brine. This chlorine gas had been previously dried by contacting with concentrated sulfuric acid to remove the major amount of water present. The water remaining was less than 100 p.p.m. This vapor was passed into the phosgene-generating reactor which contained a catalyst bed of activated charcoal to produce a phosgene content in the resulting chlorine vapor within the range of about 40 to 80 parts per million, on a volume basis. The space velocity of gas through the charcoal catalyst bed was about 1,000 and the chlorine vapor was under a pressure of 80 pounds p.s.i.g., at a temperature within the range of from about 10° to 25° C. The gas stream contained sufficient carbon monoxide to produce the desired phosgene that it was unnecessary to add any from an external source.

The phosgene enhanced chlorine was then passed into a catalytic drying bed containing 1 cubic foot of a crystalline sodium alumino silicate (a zeolite) material. The foregoing catalyst material was obtained commercially under the brand name Molecular Sieve AW-300, Union Carbide. The space velocity of chlorine vapor through the drying bed was about 500 and the gas temperature was maintained within the range from about 10° C. to about 25° C. under the same pressure of approximately 80 p.s.i.g.

The water content of the effluent chlorine, which was initially within the range of from about 30 to 40 parts per million by volume was reduced to about 5 parts per million by volume. The operation was continued for about 1,310 hours to remove 1.7 pounds of water from 707,000 standard cubic feet of chlorine vapor. At the end of this period, the system was still operating very well, with the water content often being reduced to less than 3 parts per million by volume (or less than 1 part per million on a weight basis).

Based on water-absorbing capacities for the catalyst as provided by the manufacturer, it would be predicted, assuming the drying catalyst had been functioning as a simple absorbent (that is, no reaction had occurred between the phosgene and water vapor) that the drying catalyst would have removed less than about 1 pound of water per cubic foot of catalyst under the specified operating conditions.

In actual practice, utilizing the same apparatus and drying catalyst as was used above, and using a chlorine stream containing substantially no phosgene, it was discovered that only 0.09 pound of water was removed before the drying catalyst became saturated to the point that water was no longer removed from the incoming chlorine stream. Thus, without phosgene present to react with water, the catalyst acts only as an absorbent and incompletely removes the water.

EXAMPLE 2

In a manner similar to that described in Example 1, another drying operation was conducted utilizing silica gel in place of the zeolite material as the drying catalyst bed.

The wet chlorine vapor, with varying contents during operation of from 200-4000 parts per million of carbon monoxide and 20-100 parts per million of water vapor, was passed through the activated charcoal bed at a space velocity of about 1000 and under a pressure of 36–40 p.s.i.g. at a temperature ranging from 5° to 50° C. Under these conditions, the phosgene reactor produced about 35 parts per million, on a volume basis, of phosgene in the chlorine vapor. Additional phosgene, in amounts up to about 100 p.p.m., was produced when this stream was subsequently passed through silica gel as described below.

The phosgene enhanced chlorine was then passed through the silica gel drying catalyst bed at a space velocity of about 500 and at a temperature within the range from about 5° to about 50° C. This operation was continued for 6,132 hours, during which period 4.4 pounds of water was removed from 5.03 million standard cubic feet of chlorine vapor. At the termination of the run, the catalyst bed was still operating efficiently to reduce water vapor to a few parts per million by volume.

Based on sales information of the manufacturer of the silica gel absorbent, it would have been expected that the silica gel would absorb about 0.2 pound of water per cubic foot of silica gel under the specified reaction conditions.

It is evident from the foregoing that the water vapor is reacting with the phosgene to produce carbon dioxide and hydrogen chloride, which do not interfere with the catalytic activity of the drying bed.

Although the phosgene was produced in situ in the foregoing reactions by reacting carbon monoxide naturally present in the chlorine cell effluent gas, it will be evident to those skilled in the art that the phosgene may be administered directly to the chlorine gas stream as well as by generation in situ. It is also clear that, should cell effluent lack carbon monoxide, this gas could be introduced into the chlorine to prepare phosgene in situ as described above.

What is claimed is:

1. A process which comprises incorporating phosgene into a mixture containing chlorine and water and contacting the resulting mixture with a solid catalyst consisting of either silica gel or sodium alumino silicates for the hydrolysis of phosgene whereby the water content of the chlorine is reduced.

2. A method as in claim 1 wherein the chlorine is gaseous and phosgene is produced in situ within the chlorine gas stream.

3. A method as in claim 2 wherein the chlorine-water vapor mixture also contains carbon monoxide and phosgene is generated in situ by contacting the mixture with a phosgene generating catalyst.

4. A method as in claim 3 wherein the phosgene generating and phosgene hydrolysis reactions are carried out in separate catalyst beds.

5. A method as in claim 3 wherein the phosgene-generating and phosgene hydrolysis reactions are carried out in the same catalyst bed comprised of a solid catalyst consisting of either silica gel or sodium alumino silicates.

6. A method as in claim 2 wherein phosgene is incorporated into the chlorine gas by (a) introducing carbon monoxide into the chlorine and (b) passing the mixture through a phosgene generating catalyst.

* * * * *